United States Patent [19]

Goubeaux et al.

[11] Patent Number: 4,946,199
[45] Date of Patent: Aug. 7, 1990

[54] HIGH PRESSURE TUBE ATTACHMENT MECHANISM

[75] Inventors: Carl E. Goubeaux, Troy; Donald M. Flory, Arcanum, both of Ohio

[73] Assignee: General Motors Corporation, Detroit, Mich.

[21] Appl. No.: 381,602

[22] Filed: Jul. 18, 1989

[51] Int. Cl.⁵ .............................................. F16L 35/00
[52] U.S. Cl. ...................................... 285/24; 285/39; 285/215; 285/382
[58] Field of Search ............ 285/189, 215, 382, 382.1, 285/382.5, 382.7, 421, 39, 24; 403/368, 374

[56] References Cited

U.S. PATENT DOCUMENTS

| | | | |
|---|---|---|---|
| 527,883 | 10/1894 | Pratt | 285/215 |
| 718,609 | 1/1903 | Drake | 285/215 |
| 1,304,414 | 5/1919 | Triplett | 285/215 X |
| 2,460,635 | 2/1949 | Herold | 285/382.7 X |
| 3,888,523 | 6/1975 | Bartholomew | 285/382 |
| 4,181,064 | 1/1980 | Flory | 60/548 X |
| 4,248,135 | 2/1981 | Peeples et al. | 91/49 |
| 4,553,776 | 11/1985 | Dodd | 285/382.7 |
| 4,765,659 | 8/1988 | Goubeaux et al. | 285/215 |
| 4,770,449 | 9/1988 | Goubeaux et al. | 285/215 |
| 4,799,715 | 1/1989 | Goubeaux et al. | 285/215 |

Primary Examiner—Dave W. Arola
Assistant Examiner—Franco S. Deliguori
Attorney, Agent, or Firm—E. E. Helms

[57] ABSTRACT

Mechanism for attaching a high pressure tube to an opening in a housing using a tapered opening into which a high pressure tube is inserted. A fitting has one end positioned about the tube end and is then press fitted not only to the housing on an outer diameter fitting section but also inwardly against the tube end as well as the other fitting end being press fitted to the housing to further secure the fitting to the housing, all of the press fits providing high pressure seals. The fitting other end also provides for prealignment of a fitting cross passage with a housing side passage so that high pressure fluid flowing between the tube and the side passage has minimal directional change in passing from the cross passage to the side passage. The fitting other end is adapted to receive press fitting force in axial alignment with the fitting.

3 Claims, 1 Drawing Sheet

HIGH PRESSURE TUBE ATTACHMENT MECHANISM

BACKGROUND OF THE INVENTION

Mechanism for attaching one end of high pressure tubing to a housing which provides appropriate passages for conducting fluid under high pressure to and from the interior of the tubing. The attachment device fits about a tubing end and the device and the tubing end are press-fitted into a tapered opening of the housing so that the device is secured to both the housing and the tubing, creating high pressure seal areas by the press-fitting action.

DESCRIPTION OF RELATED ART

The invention relates to U.S. Pat. No. 4,799,715, entitled, "High Pressure Tube Attachment Mechanism" and issued Jan. 24, 1989 to the common assignee. Other patents also assigned to the common assignee relate to the invention and include U.S. Pat. Nos. 4,765,659 issued Aug. 23, 1988 and 4,770,449 issued Sept. 13, 1988. All of these listed patents have the same title, and have the same joint inventors as the inventors of the invention herein disclosed and claimed.

These patents show various press-fitted tube attachment devices. The most pertinent patent is U.S. Pat. No. 4,799,715. It discloses and claims a closed end device of which the invention herein disclosed and claimed is a specific improvement

SUMMARY OF THE INVENTION

The device embodying the invention is a closed end ferrule-like fitting. It has a bulbous-like enlarged section forming part of the closed end, with an annular recess between the enlarged section and a rounded head flange. The rounded head has a cross socket. The head is adapted to receive an installation tool shaped to fit the rounded head and cross socket formed in it. The cross socket is perpendicular to a cross passage formed through a central section adjacent to the enlarged section on the axially opposite side thereof from the rounded head flange. The cross passage is a part of a fitting passage which includes a lower passage section extending axially through the foot section of the device and opening through a reduced diameter passage section into the cross passage. The reduced diameter passage section has an inner shoulder which joins one end of that section with the adjacent end of the lower passage section. There is also an external shoulder formed on the central section in approximate lateral alignment with the inner shoulder. The foot section of the device is an annular wall in which the inner wall of the outer end of the lower passage section is conically tapered to provide a guide for receiving the tube to be attached into the lower passage section until the tube end is seated against the inner shoulder. The outer wall surface of the lower passage section is a right circular cylindrical wall surface.

The housing in which the device is press-fitted has a stepped passage formed therein comprising a first section having about a 2° taper so that its outer end is smaller in diameter than its inner end. The passage first section opens into the passage second section through a conical shoulder. The passage second section has a side passage intersecting it on one side thereof and axially spaced from the conical shoulder. The passage second section opens through a shoulder into the passage third section, which opens outwardly of the housing. The passage third section is diametrically larger than the device head. The passage second section is diametrically larger than the device central section but diametrically smaller than the bulbous-like enlarged section. The inner wall surface of the lower foot section is of a diameter so as to slide over the end of the tube to be attached. The wall surface of the housing passage first section at its end opening into the passage second section is slightly larger than the outer wall surface of the tube being attached so that the device lower foot section will fit slightly into the passage first section before the wall taper results in a wedging action with further axial movement of the device into the passage first section.

Although there is an annular space formed in the second passage section section by the device and the second passage section side wall when the device is installed so that the housing side passage is assured of being in fluid communication with the interior of the tube, it is preferable that the device be aligned so that the cross passage in in alignment with the opening of the side passage into the second passage section. By providing the head cross socket, a mating tool can be used to be sure that the device is properly oriented before installation to achieve this alignment.

When the device is being installed, it is fitted over the end of the tube which is extending through the foot section first passage section and at least well into the second passage section. The installation tool is fitted to the head of the device with its cross bar received in the head cross socket, the tool then being oriented until the cross passage of the device is aligned to open into the side passage. The installation tool then axially presses the device into the housing passage, moving the tube with it as the tube end is in engagement with the inner shoulder, the foot section of the device entering the passage first section and the bulbous enlarged section entering the passage second section. Both the foot section and the bulbous enlarged section are press-fitted into their respective passage sections until the head flange engages the passage shoulder separating the second and third passage sections. Further axial press-fitting movement of the device causes the part of the shoulder in axial surface engagement with the head flange to be deformed into the recess between the enlarged bulbous section and the head flange, self-staking the device in position. This is the condition shown in FIG. 2. The tapered press-fit action between the device foot section and the tapered wall of the passage first section tightly seals the device to the housing and also press-fits the device to the tube, retaining and sealing the tube relative to the device and the housing. The press-fit action of the enlarged bulbous section on the wall of the passage second section and the head flange on the housing shoulder combine to provide two sealing points beyond the cross passage and also secures and retains the device in the housing. The external shoulder of the device on the device central section does not normally engage the conical surface of the passage wall. However, if for some reason the device is press-fitted much further into the passage from the position shown in FIG. 2, it will engage that wall and then require an large increase in the press-fit force to move the device further. Therefore it effectively provides a maximum installation position which assures that there is sufficient fluid flow between the interior of the tube and the side passage.

BRIEF DESCRIPTION OF THE DRAWINGS

FIG. 1 shows the mechanism in position before installation has commenced. FIG. 2 shows the mechanism after installation and the securing action has been completed.

DESCRIPTION OF THE PREFERRED EMBODIMENT

Figure 1:
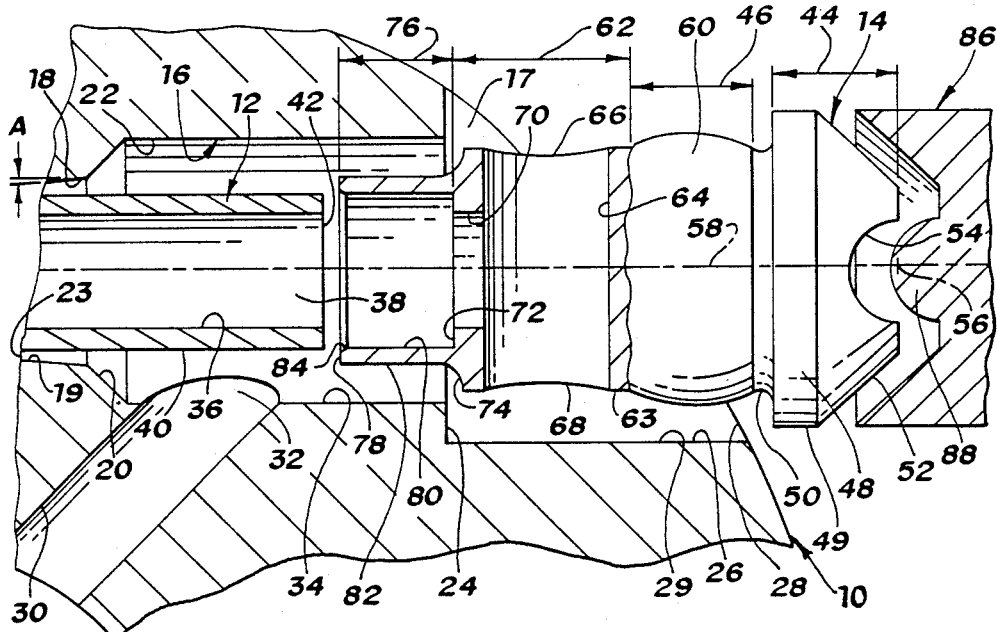
FIG. 1 and FIG. 2 are cross-section views with parts broken away and illustrating an embodiment of the invention.

The mechanism of the invention includes a housing 10, a tube 12 to be securely attached to the housing, and the attachment device or fitting 14. Fitting 14 is a closed end ferrule-like fitting. The tube may be a spring tube such as that disclosed and claimed in U.S. Pat. No. 4,754,604 entitled, "Hydraulic Brake Booster With Tubular Conduit Return Spring" and assigned to the common assignee.

Housing 10 has a stepped passage 16 formed therethrough. An outer end 17 of passage 16 forms a passage opening to the exterior. Passage 16 has a first section 18, one end of which is the opening at the housing end shown at 23 which is opposite outer end 17; a conical shoulder 20; a second section 22 of larger diameter than first section 18 and connected with the first section 18 by conical shoulder 20; a shoulder 24; and a third section 26 opening at 28 to the exterior of the housing. Passage third section 26 has a side wall surface 29. Passage first section 18 has a side wall surface 19 which is tapered with about a 2° taper, illustrated in exaggerated form by angle A, with the larger diameter end of the section 18 being the one that opens into the second section 22 via conical shoulder 20. A side passage 30 opens at 32 through the side wall 34 of passage second section 22. Opening 32 is preferably spaced from the conical shoulder 20 but near it. Side passage 30 conducts high pressure fluid from passage 16 to a suitable chamber as better disclosed in U.S. patent application Ser. No. 728,279 entitled, "Hydraulic Power Booster", filed Apr. 29, 1985, now U.S. Pat. No. 4,924,755, and assigned to the common assignee. In that application, the tube has one end fastened to a housing which is normally fixed in place and the other end fastened to another housing which is movable. The invention herein disclosed and claimed is particularly applicable to fasten that tube other end to the movable housing.

Tube 12 is a circular cross-section tube having an inner wall surface 36 defining the tube interior 38, an outer wall surface 40, and a tube end 42. The outer diameter of tube 12 is smaller than the minimum diameter of the passage tapered first section 18.

The fitting 14 has a closed end head formed by head section 44 and the bulbous enlarged section 46. Head section 44 includes a base flange 48 connected to section 46 by an annular outwardly opening recess 50. The outer side surface 49 of flange 48 is larger in diameter than the maximum diameter of section 46. The head section 44 further includes a frusto-conical head surface 52 extending axially from flange 48. A driver socket 54 is formed in the top of head surface 52. Socket 54 is preferably a cross channel having its axis 56 passing through the fitting axis 58 and perpendicular thereto. The channel is illustrated as having a semi-circular cross section, but other appropriate socket shapes may be employed.

The bulbous enlarged section 46 is illustrated as being shaped somewhat like the outer peripheral surface of a torus in that, as seen in axial cross section, the surface 60 is arcuately formed. The maximum diameter of section 46 is greater than the diameter of the passage second section 22, and its minimum diameter, at either axial end of the section, is less than the diameter of the passage third section 26.

Fitting 14 has a central section 62 joining section 46 on the axial end thereof opposite head section 44. Central section 62 has an outer side wall surface 63 and a cross passage 64 extending therethrough. The cross passage has ends 66 and 68 opening through the side wall surface 63 of central section 62.

The lower part of central section 62 has a passage section 70 extending therethrough axially of the fitting 14. An internal shoulder 72 is on the lower side of section 62, and passage section 70 opens through that shoulder as well as opening through the wall of cross passage 64. An external shoulder 74 is formed on the lower outer part of central section 62. Central section 62 is smaller in diameter than the diameter of side wall 34 of housing passage second section 22.

Fitting 14 has a foot section 76 which extends axially from central section 62. Foot section 76 is tubular, with one end terminating at shoulder 72 and the other end 78 being the lower end of the fitting. Section 76 has an inner wall surface 80 and an outer wall surface 82. It is preferably of constant outer diameter, with the inner wall surface also being cylindrical, but with a taper 84 provide at end 78. The inner wall surface 80 is preferably a close fit with the outer surface 40 of tube 12. The width of shoulder 72, defined by the smaller diameter of passage section 70 and the larger diameter of inner wall surface 80, is preferably substantially equal to the radial thickness of the tube between its inner surface 36 and its outer surface 40. The outer wall surface 82 is a close sliding fit with the opening of housing passage section 18 into the conical shoulder 20. It will fit with axial movement slightly into the passage first section 18 before the taper of the inner wall of that passage section results in a wedging action.

Figure 2:
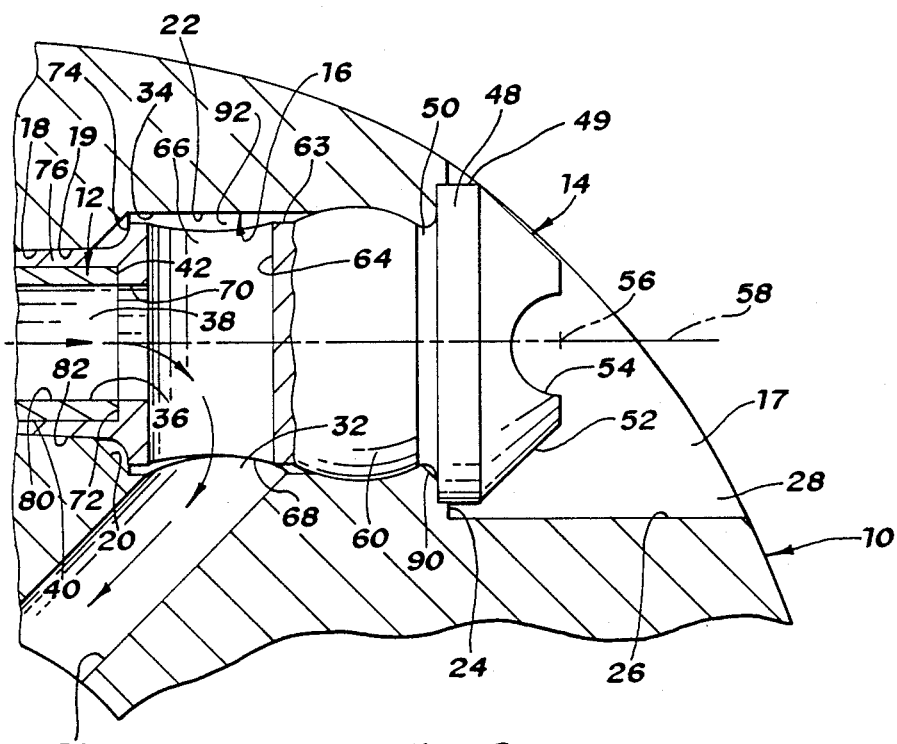

When the fitting device is being installed, tube 12 has its end 42 extending into passage 16 at least as far as slightly beyond said passage opening 32 The foot section 76 of the fitting 14 is fitted over the tube end, the tube end being received through the inner wall surface until the tube end 42 engages shoulder 72. The installation tool 86 is somewhat schematically shown in the drawing but has the capability of fitting the head of the fitting device, rotating to drive the fitting device into a desired position and exerting controlled axially applied force to press the fitting device into place in the housing. The frusto-conical mating portions of the installation tool and the fitting frusto-conical head, together with the cross socket and cross drive member of the installation tool, assure the axial direction of the press fitting force applied to the fitting. If the tool 86 is not already in place, it is placed over the head 52 so that the tool mating drive member 88 fits in socket 54. If socket 54 is not arcuately aligned so that the cross passage 64 will not be aligned with side passage opening 32, the tool and the fitting are rotated until that position is attained When automatic installation equipment is used, this preorientation of the fitting is normally completed as a part of the loading of the fitting into the installation equipment. The installation tool 86 then forces the fitting axially in a press-fit operation. As the tool and fitting is moved axially downward, the tube end 42 is moved downwardly, and the fitting foot section end 78 enters the housing passage first section 18. Conical shoulder 20 will assist in guiding this part of the operation as may be necessary. Further axial movement results in a press-fit of the fitting foot section 76 into the housing first section 18, and at the same time a press-fit of the fitting foot section 76 to the portion of the tube 12 which is within the foot section. Both of these press-fits provide seals. The enlarged section 46 of the fitting 14 also enters the housing passage second section and slightly deforms the side wall 34. This is another press-fit seal. When the flange 48 engages the shoulder 24, slight further press-fitting axial movement of the fitting causes a part 90 of the shoulder 24 to be displaced into the recess 50, as is seen in FIG. 2, further securing the fitting 14 in place. This also provides a press-fit seal in the area of the recess 50 as well as the press-fit seal having been provided around fitting enlarged section 46.

Upon the completion of the press-fit installation the fitting 14 is located in the housing 10 and the tube 12 is tightly secured to the housing by the fitting as is shown in FIG. 2. Cross passage 64 has its ends 66 and 68 opening into an annular space 92 formed by the fitting central section 62 and the side wall 34 of the housing passage second section 22. Cross passage end 68 is also in alignment with the opening 32 of side passage 30 so that flow from the tube interior 38 can easily flow into the side passage 30 through cross passage 64.

If for some reason press-fitting force were to continue to be applied, fitting 14 would move axially only a small distance further before shoulder 74 would engage the conical shoulder 20, greatly increasing the resistance to the applied force. With force sensing limiters, the installation tool 86 would cease to exert the press-fitting force, the fitting 14 would still be in a satisfactory operating position, and would be securely installed so as not to leak or release the tube under high pressures such as are to be found in hydraulic brake boosters, for example.

The embodiments of the invention in which an exclusive property or privilege is claimed are defined as follows 1. A high pressure tube attachment mechanism comprising:

a housing having a stepped passage therein through which high pressure fluid may be conducted and fluid pressure transmitted and a side passage intersecting said stepped passage;

a high pressure tube for conducting high pressure fluid therethrough and for transmitting fluid pressure therethrough, said tube having an inner cylindrical surface and an outer cylindrical surface respectively having an inner surface diameter and an outer surface diameter, said tube also having one open end positioned in said housing stepped passage in fluid communication therewith so as to conduct high pressure fluid between said side passage and the interior of said tube and to transmit fluid pressure between said housing stepped passage and the interior of said tube;

and a securing device having means providing said fluid communication between said tube one open end and said housing, said securing device further having an axially extending tube-like first portion thereof received about said tube within said stepped passage in press fitted sealing relation to said tube and to said housing, an axially extending second portion extending inwardly of said housing stepped passage, and axially extending adjacent closed third and fourth portions having a reduced outer diameter area therebetween, said fourth portion defining the other end thereof axially opposite said first portion;

said housing stepped passage having a first section, said passage first section having an outer end and being defined by a wall surface conically tapered with about a two degree decreasing diameter taper which decreases toward said housing passage first section outer end, the minimum wall surface diameter of said housing stepped passage being greater than diameter of said tube, said housing stepped passage having a second section defined by a side wall surface of larger diameter than said first section and connected thereto by a conical annular shoulder, said tube one end extending axially through said housing passage first section outer end and said housing stepped passage tapered first section and at least into said conical annular shoulder;

said securing device first and second portions each having an outer surface the maximum outer diameter of which is less than the diameter of said housing passage second section side wall surface, said second portion having a cross passage therethrough said securing device third and fourth portions each having an outer surface the maximum outer diameter of which is greater than the diameter of said housing passage third section wall surface;

said securing device further having a stepped inner diameter bore formed therein through said first portion and into said second portion in at least part of which said tube one end is slidably received prior to final assembly of said attachment arrangement;

said securing device first portion having an end extending toward said outer end of said housing passage first section and fitting into said tapered first section of said housing passage;

said securing device having been axially pressed to extend into said housing opening with said securing device first and third portions being press fitted in said housing passage;

said first portion having been axially pressed to extend into said housing passage tapered first section and by press fit tapered deformation be outwardly press fitted to said housing passage tapered first section and also be inwardly press fitted to said tube to a sufficient extent to sealingly secure said tube to said housing so as to hold high fluid pressure and to hold said tube securely in said housing passage against axial and rotational removal forces tending to remove said tube from said housing, said third portion having been pressed into said housing passage second section and sealing same, said fourth portion having been pressed into engagement with said housing and deforming parts of said housing into said reduced diameter area between said third and fourth securing device portions to stake said securing device;

said securing device having a shoulder formed in said securing device stepped inner diameter bore and said tube one end having a transverse end surface in abutting engagement with said shoulder during and after the press fitting action to provide axial location of said tube one end relative to said securing device and said housing passage.

2. The attachment mechanism of claim 1 in which said securing device fourth section includes a frusto-conical head having a socket in the top thereof, said frusto-conical head and said socket being adapted to receive a mating installation drive tool for rotatably locating said securing device relative to said housing at a predetermined relative location in which said securing device cross passage and said housing side passage are substantially aligned and for then exerting said press fitting pressure axially on said securing device to install said tube and fitting in said housing as aforesaid.

3. A tube attachment mechanism comprising
a housing having a stepped passage therein having first and second and third axially aligned passage portions, a side passage intersecting said stepped passage through the side wall of said stepped passage second portion, said stepped passage first portion being tapered with the smaller diameter end thereof being axially opposite said stepped passage second portion, said stepped passage first and second portions being joined by a first shoulder and said stepped passage second and third portions being joined by a second shoulder;
a tube having an open end and an outer surface the outer diameter of which is smaller than the minimum diameter of said passage first portion, said open end extending through said passage first portion;
and a fitting having first, second, third and fourth axially aligned sections,
said fitting second section having a cross passage therethrough and having a diameter which is greater than the maximum diameter of said stepped passage first portion but less than the diameter of said stepped passage second portion,
said fitting first section having a cylindrical passage extending axially therethrough and having a diameter substantially equal to the diameter of said tube outer surface so as to receive said tube snugly but in movable relation prior to the press fit securing action occurring,
said fitting further having a reduced diameter passage section formed as a part of said fitting second section and connecting said cylindrical passage and said cross passage and having a diameter substantially equal to the internal diameter of said tube, and an internal third shoulder formed as a part of said fitting second section at the end of said cylindrical passage adjacent said reduced diameter passage;
said fitting third section having an annular bulbous outer surface the maximum diameter of which is greater than said housing passage second portion but less than said housing passage third portion, said fitting third section being joined to said fitting fourth section by an annular reduced area section;
said fitting fourth section having an annular flange thereon joining said annular reduced area section, said flange being greater in diameter than said housing passage second portion but smaller in diameter than said housing passage third portion;
said fitting fourth section further having a frusto-conical head adjoining said flange at the base of said head with the outer end of said head having a cross socket formed therein the axis of which is perpendicularly skew to the axis of said cross passage of said fitting second section;
said fitting being aligned by means of said cross socket so that said cross passage has one end positioned arcuately to align with said housing side passage after being installed and then being press fitted by axially aligned press fitting force exerted thereof through said cross socket and said frusto-conical head into said housing passage with said tube open end in axial engagement with said internal third shoulder, said fitting first section being press fitted to said housing first section and to said tube outer surface by tapered press fitting action as said fitting first section is moved axially into said housing passage tapered first portion, said fitting third section bulbous outer surface being press fitted into said housing passage second section, and said fitting fourth section flange engaging said housing passage second shoulder and by press fitting force displacing an annular part of said second shoulder into said fitting reduced diameter area to stake said fitting, said press fits and said stake securing and sealing said fitting and said tube in said housing so that high pressure fluid may be conducted between the interior of said tube and said housing side passage through said fitting first section passage and said fitting second section reduced diameter passage section and said cross passage without leakage.

* * * * *